United States Patent Office 3,019,704
Patented Feb. 6, 1962

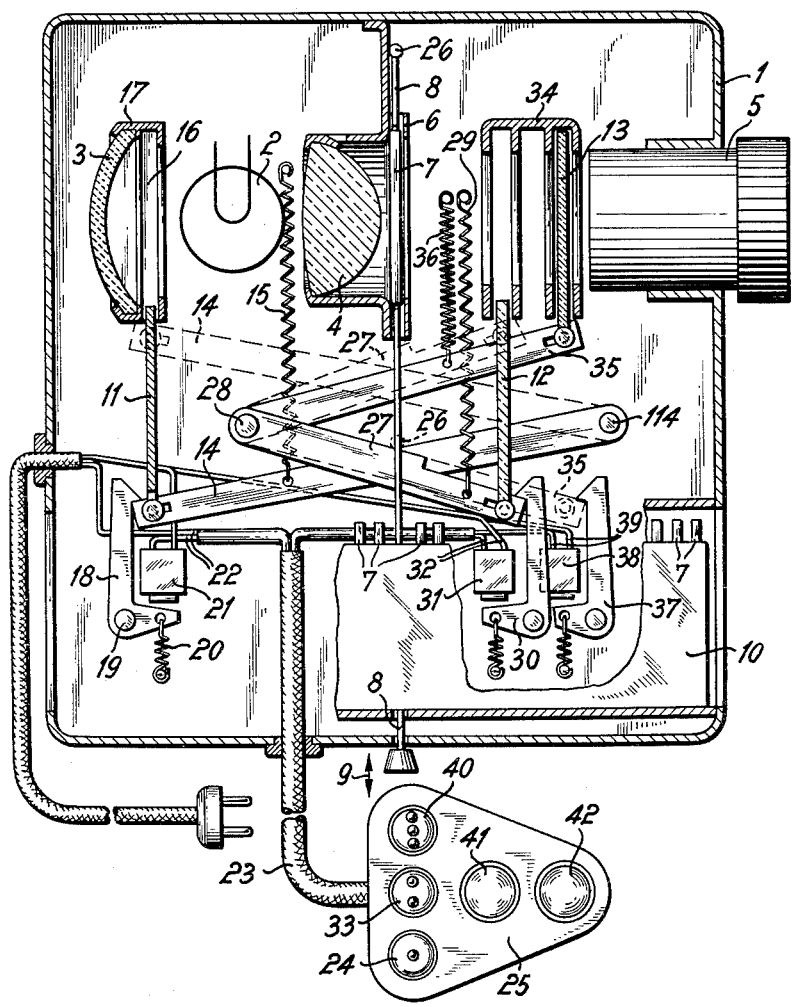

3,019,704
LIGHT OUTPUT MODIFYING ARRANGEMENT FOR SLIDE PROJECTORS
Erich Zillmer, Braunschweig, Germany, assignor to Voigtlander, A.G., Braunschweig, Germany, a corporation of Germany
Filed Oct. 24, 1960, Ser. No. 64,328
Claims priority, application Germany Oct. 28, 1959
11 Claims. (Cl. 88—26)

This invention relates to slide projectors and, more particularly, to means for selectively modifying the quantity or quality of the light output of such projectors.

In one known form of processing photographic film, the positives made from the exposed negatives are in the form of slides which are arranged to be mounted in a slide projector and selectively projected upon a suitable screen. If all of the negatives or "shots" of a given series were properly exposed, the brightnesses of the projected positive slides would be about equal or at least of the same order. However, in any given series of exposures, there is quite likely to be overexposed pictures as well as underexposed pictures. The positive slides resulting from the overexposed pictures will, of course, permit more light to pass therethrough and therefore will appear much brighter on the screen. By selectively reducing the light output of the projector, the brightness of projected slides of overexposed "shots" can be made to be about equal to the brightness of slides of normally exposed "shots."

Such slide projectors usually include a casing in which is mounted a light source, behind which is arranged a concave mirror for directing light through a suitable condensing lens arranged adjacent a support in which a slide carrier is movable to selectively bring different slides from a magazine into alignment with the optical axis of the projector. Light passing through these slides is then directed through a focusing objective on the front of the casing and thus onto the screen.

It has been suggested, in an unpublished disclosure, that a reduction of the light output of the projector can be obtained by inserting a light masking means or shutter mask between the concave mirror and the lamp of the projector. By this suggestion, a single variation in the light output of the projector may be obtained by reducing the projected light by the amount reflected by the mirror, but it is not possible to variably adjust the light output with respect to slides made from negatives or "shots" which may have been overexposed varying amounts.

The object of the present invention is to provide selective multiple stage variation of the light output of the projector so that slides made from negatives which have been overexposed in varying amounts may be projected onto the picture screen wtih substantially the same brightness as slides made from normally exposed negatives. According to the present invention, this is effected by using, in a slide projector and in addition to such masking device which can be inserted between the concave mirror and the lamp, at least one additional light modifying means or mask, of a more or less light permeable material and selectively inserted between the slide and the objective in the path of the light rays of the projector.

Various means may be used as the light modifying means. For example, so-called "grey filters" can be used, these filters being characterized by various degrees of light permeability. If more than one light modifying means is used, either the several light modifying means may have different light permeabilities or they can all have the same light permeability and be used either singly or in combination to modify the projected light varying amounts.

It is also within the scope of the invention to use, instead of such "grey filters," or in conjunction therewith, color correction filters.

An advantageous feature of the present invention is the provision of remote control means, preferably electrically operated, whereby the light modifying means may be selectively inserted into the path of light rays from a distant or remote location.

For an understanding of the principles of the invention, reference is made to the following description of a typical embodiment thereof as illustrated in the accompanying drawing. In the drawing, the single figure is a top plan view, partly broken away, of a slide projector embodying the present invention.

Referring to the drawing, the projector is illustrated as including a casing 1 in which are mounted a projector lamp 2, a concave mirror 3, a condensing lens 4, and an objective 5. A support 6 for a movable carrier 8 for slides 7 is disposed between condensing lens 4 and objective 5. In a known manner, the carrier 8 is arranged to move slides 7 selectively out of a magazine 10 and into the operative position on support 6, and to return the slides 7 to the magazine 10.

In accordance with the present invention, a shutter mask 11 is arranged to be inserted between lamp 2 and the concave mirror 3, and light varying means 12 and 13 are arranged to be inserted between the slides 7 and the objective 5.

The mask or light blocking means 11, which is preferably a light impermeable plate, is secured to the free end of a lever 14 pivoted on a pin 114. A tension spring 15, having one end secured to lever 14 and the other end secured to projector casing 1, biases lever 14 to move to the position shown in dotted lines in the drawing. In this position, the mask 11, which slides in a guide 16 of the mounting 17 for mirror 3, is disposed between the projector lamp 2 and mirror 3. When mask 11 is in this position, the brightness of the light projected from the projector through the objective is reduced by that portion of the light which is normally reflected by the concave mirror 3.

The lever 14 carrying the mask 11 is releasably latched in the full line position by a pawl 18 pivoted on a pin 19 and having an end engaging the free end of lever 14. Pawl 18 is biased to the latching position by a spring 20. Pawl 18 can be moved to the release position by means of an electromagnet 21, whereup the hooked end of pawl 18 disengages the free end of lever 14 so that spring 15 will swing lever 14 to move the shutter mask 11 into its operative position. Electromagnet 21 is connected by conductors 22 and a cable 23 with a switchbutton 24 in a remote control casing or unit 25. When button 24 is depressed, an energizing circuit for electromagnet 21 is closed.

When mask 11 is in the operative position between lamp 2 and mirror 3, it will be moved to the retracted position whenever the slide carrier 8 is operated to change the slide 7. For this purpose, the picture changing carrier 8 is provided with an abutment 26 projecting into the path of movement of lever 14. During its movement returning a slide 7 to magazine 10, the carrier 8, through abutment 26, engages the lever 14 when the latter is in the position shown in dotted lines, and effects movement of this lever to the full line position where it is latched by pawl 18. In the drawing, member 26 is shown in dotted outline in the position in which it engages lever 14.

The masks 12 and 13 disposed between the slide support 6 and the objective 5 are mounted and guided in a manner similar to that described in detail in connection wtih the mask 11. Member 12 is secured to the free end of a lever 27 pivoted on a pin 28 and biased by a tension spring 29 to the position in which mask 12 is inserted in the path of the light rays. A pawl 30 releasably latches lever 27 in the full line position, and an electromagnet 31 is provided to release the pawl 30. Electromagnet 31 is connected by conductors 32 and remote control cable 23 with a switchbutton 33 in the control casing 25. When button 33 is depressed, electromagnet 31 is energized so that pawl 30 releases lever 27, whereupon spring 29 will swing lever 27 to move mask 12 into the path of the light rays. Member 12 slides in a guide 34. The abutment 26 on the carrier 8 is also arranged to engage the lever 27 and move the latter back to the full line position when the slide carrier 8 is moved in a direction to return a slide 7 to the magazine 10.

Masking member 13 is secured to a lever 35 pivoted on a pin 28 and biased by a spring 36 toward the full line position. A pawl 37 is operatively associated with the free end of lever 35, and is arranged to be moved to the release position by an electromagnet 38. Conductors 39 and remote control cable 23 connect electromagnet 38 with a switchbutton 40 located in control casing 25.

Thus, by depressing switchbuttons 24, 33, or 40, it is possible to selectively insert light blocking mask 11, or light modifying masks 12 and 13, individually or together into the path of the light rays of the projector and thereby to modify the projected light in accordance with the light permeability of a particular slide to be projected in any specific case. Whenever a slide is changed or returned to the magazine, the inserted light modifying members are withdrawn from the path of the light rays.

Modifiers 12 and 13 may be "grey filters" having equal light permeability or they may have different light permeability. Furthermore, more than three light modifying or blocking means may be used, if desired. Also, either in place of the "grey filters" or in combination therewith, color correction filters can be inserted into the path of the light rays.

In order easily to distinguish the buttons 24, 33, and 40 from each other, in the absence of ambient lighting, and also to distinguish these from other pushbuttons arranged in casing 25, such as the button 41 for changing the slides and the button 42 for adjusting the objective, the buttons 24, 33 and 40 can be provided with relief markings or signs. For example, these buttons may be provided with one, two, or three projections, as illustrated in the drawings, and be arranged in a group in the casing 25. It is also within the scope of the invention to provide the buttons 24, 33, and 40 with different types of luminescence so that they are visible and distinguishable in the absence of ambient lighting.

While spring means have been shown for biasing the masking members into the operative position in the path of the light rays, it will be understood that the members may be so disposed, and the casing 1 so oriented, that the masks may be biased by gravity to the operative position, thus eliminating the necessity for the several tension springs.

While a specific embodiment of the invention has been shown and described in detail to illustrate the application of the principles of the invention, it will be understood that the invention may be embodied otherwise without departing from such principles.

What is claimed is:

1. A slide projector comprising, in combination, casing; a light source, a concave mirror arranged behind said light source, and a light projecting objective mounted in said casing, in alignment with the projector light axis, and arranged for said mirror to direct light rays through said objective; plural light modifying elements each mounted in said casing for movement between an operative position, in which it is disposed in the path of light rays along the projector axis, and an inoperative position, in which it is disposed out of the path of light rays along the projector axis; and plural operating means, each associated with a respective one of said elements, for effecting movement of its associated element to its operative position independently of any other of said elements; whereby all of said elements may be maintained in said inoperative position or a selected number of said elements may be selectively moved to the operative position, at will and in accordance with the desired character and degree of light modification.

2. A slide projector as claimed in claim 1 in which one of said light modifying elements comprises a shutter mask mounted in said casing for movement between an operative position, in which it is disposed between said light source and said mirror to prevent passage of light rays to said mirror, and an inoperative position, in which it is disposed out of the path of light rays along the projector axis; and at least another of said light modifying elements comprises a grey filter movable to an operative position in which it is disposed in the path of light rays between said light source and said objective.

3. A slide projector as claimed in claim 2 in which at least one other of said light modifying elements comprises a color correction filter movable to an operative position in which it is disposed in the path of light rays between said light source and said objective.

4. A slide projector as claimed in claim 3 including means biasing said light modifying elements to the operated position; a slide support mounted between said light source and said objective in the path of light rays; a slide carrier operable to move slides between a slide magazine in said casing and said slide support; and means on said slide carrier operable, during movement thereof in returning a slide to the magazine, to move said light modifying elements to the inoperative position.

5. A slide projector as claimed in claim 4 including releasable latch means retaining said light modifying elements in the inoperative position.

6. A slide projector as claimed in claim 5 including respective electromagnetic means for operating said releasable latch means to the release position; and remote control means selectively operable to energize said electromagnetic means.

7. A slide projector as claimed in claim 6 including a remote control unit; control switch buttons in said unit selectively operable to effect movement of said slide carrier and to effect adjustment of said objective; said remote control means comprising switch buttons in said remote control unit.

8. A slide projector as claimed in claim 7 in which the switch buttons for said light modifying elements are arranged as a separate group in said remote control unit.

9. A slide projector as claimed in claim 7 in which each of said switch buttons is provided with an individual distinguishing means, whereby said switch buttons may be located in the absence of ambient lighting.

10. A slide projector as claimed in claim 9 in which said distinguishing means comprises differing luminescent masses.

11. A slide projector as claimed in claim 9 in which the switch buttons controlling operation of said light modifying elements are provided with relief formations for distinguishing one from the other.

References Cited in the file of this patent

UNITED STATES PATENTS 971,709    Welles _____ Oct. 4, 1910

FOREIGN PATENTS 899,429    Germany _____ Dec. 10, 1923